United States Patent [19]
Gantert

[11] 3,946,431
[45] Mar. 23, 1976

[54] SYNCHRONIZED DEMODULATION OF THE CHROMINANCE SIGNAL WITH SWITCHED CARRIER PHASE ANGLES

[75] Inventor: Manfred Gantert, Anaheim, Calif.
[73] Assignee: BASF Aktiengesellschaft, Ludwigshafen (Rhine), Germany
[22] Filed: Oct. 1, 1974
[21] Appl. No.: 510,910

[52] U.S. Cl. .................................... 358/9; 358/23
[51] Int. Cl.² ........................................ H04N 9/34
[58] Field of Search .................. 358/4, 9, 14, 23

[56] References Cited
UNITED STATES PATENTS
3,786,178   1/1974   Scholz ................................ 358/4

Primary Examiner—George H. Libman

[57] ABSTRACT

A color video system in which the chrominance portion of a composite video signal, such as an off-air TV signal, is transmitted or recorded in the form of a trisequential sequence containing in lieu of the original colors R, G, B the substitute colors R', G' B', and in which at the receiving or playback end a luminance signal $Y_M=0.33(R'+G'+B')$ is derived from the trisequential substitute color signal, where R', G', B' are chosen so that $Y_M$ also satisfies the relationship $Y_M=0.30R + 0.59G + 0.11B$ required for black and white compatibility. The technique used at the transmitting or recording end obviates the necessity of first developing for this purpose the original colors and then deriving therefrom the substitute colors by the addition to the former of a separate signal $Z=-0.03R + 0.26G - 0.22B$, as proposed in the prior art. This simplification is attained herein by immediately demodulating the chrominance portion trisequentially along axes related to the substitute colors, preferably along substitute-color difference axes R'–Y, G'–Y, B'–Y.

6 Claims, 7 Drawing Figures 3,946,431

SYNCHRONIZED DEMODULATION OF THE CHROMINANCE SIGNAL WITH SWITCHED CARRIER PHASE ANGLES

The invention relates to color video systems and more particularly to such systems in which the color information is transmitted or recorded in trisequential form.

Systems of the aforementioned type are known in which the transmitted or recorded trisequential signals are not the true colors R, G and B but are "substitute" colors R', G' and B'. The use of these substitute colors for transmission or recording makes it possible to conveniently derive from these colors at the receiving end, or in playback, a luminance signal Y= +0.30R + 0.59G + 0.11B. As is well known in the art, the proportions established by this equation correspond to the relative brightness of the three primary colors red, green and blue. Thus, a scene reproduced in black and white by this luminance signal Y looks the same as when it is televised in monochrome. It may be mentioned in passing that while, for the sake of uniformity, the three colors have been assumed throughout this specification to be in the order red, green and blue, the order in which the colors are cyclically following each other is immaterial.

A system of this kind has been described, for example, in German published patent application of W. Hartmann, DAS 2,158,218 entitled Method and Circuit Arrangement for the Pre-Distortion of a Trisequential Color TV Signal for a Circuit for the Conversion of this Signal into a FBAS-Color Video Signal. As explained in this German patent application, the receiving or playback end of the system disclosed therein, has provisions for deriving from the "substitute" trisequential color signals R', G', and B' a luminance signal $Y_M=0.33(R'+G'+B')$ where $R'=R+Z$, $G'=G+Z$, $B'=B+Z$ and $Z=-0.03R + 0.26G - 0.22B$. More specifically this derivation is carried out by adding together, and then demodulating, the signals of subcarrier frequency present at the input, the junction point and the output of the series arrangement of the delay lines as typically used in such systems for reconverting the trisequential into simultaneous color signals. With the foregoing relationships then, $Y_M$ becomes equal to +0.30R + 0.59G + 0.11B, the proportions required for black and white compatibility as set out above. It may be mentioned at this point that the notation for the "substitute" colors as actually used in DAS 2,158,218 is G*, R*, B*—rather than the notation G', R', B' employed in the present application.

The physical implementation of the transmitting or recording end of the system according to the Hartmann patent application corresponds exactly to the structure of the above equations. That is, Hartmann first develops, in a corresponding demodulating circuit, the three basic colors R, G and B themselves, produces from these basic colors in a "weighting stage" the partials −0.03 R, +0.26G and −0.22B and, in an adding stage, adds all of these partials—which taken together yield a Z signal—to the trisequential color sequence R, G, B to obtain, as a result of this preprocessing or "predistorting" the trisequential sequence R', G', B'. In a subsequent summing stage the high frequency luminance $Y_H$ is then added to the foregoing trisequential sequence and the sum of these signals is fed to a tape recorder for recording.

It is an object of the present invention to provide a greatly simplified method and apparatus for generating the above mentioned "substitute" trisequential signals.

It is a more specific object of the invention to provide a method and apparatus for generating these "substitute" trisequential signals, in which the necessity of first developing for this purpose the three basic colors, R, G and B and of then processing these basic colors by the addition of a Z signal, is obviated.

The foregoing objects are met, briefly, by taking the phase angles, and preferably also the magnitudes, of the vectors of the desired substitute color signals into account in the demodulating process itself. More particularly, in the embodiment of the invention described hereinafter the chrominance component of the composite video signal at the outset is demodulated trisequentially in a three-phase synchronous demodulator along the axes R'—Y, G'—Y and B'—Y where R', G' and B' are the above mentioned substitute color signals. In this manner the trisequential difference signals $R'-Y_L$, $G'-Y_L$, $B'-Y_L$ can be produced and by matrixing these signals with the luminance $Y=Y_L+Y_H$—where $Y_L$ is the low frequency luminance and $Y_H$ the high frequency luminance—the trisequential signal (R',G', B') plus $Y_H$ is obtained for transmitting or recording.

Three-phase demodulation is preferably effected, generally speaking, in accordance with the principles of copending patent application Ser. No. 473,221 filed by B. J. Okey on May 24, 1974, and entitled Trisequential Color Video Record-Playback Method and Circuits. That is, a modulated subcarrier is generated by a stabilized oscillator and by means of a phase splitter three sub-carrier phases are produced which through a synchronously driven trisequential switch, are trisequentially supplied to one input of an AM demodulator. Another input of this demodulator has the color subcarrier modulated chrominance component of the composite video signal, say, an off-air TV signal, impressed thereon. In the Okey application the three phases developed by the phase splitter are the three original colors R, G and B and then a phase shifting arrangement of one sort or another is used to cause the demodulator to demodulate for the difference signals R—Y, G—Y, B—Y. In contradistinction, in the arrangement according to the present invention the three phases supplied to the demodulator are chosen so that demodulation takes place along axes related to the substitute colors R', G', B', more specifically along the axes of the difference signals R'—Y, G'—Y, B'—Y. In this manner the demodulation process itself already produces a trisequential signal which at the receiving or playback end yields a luminance signal exhibiting black and white compatibility.

A preferred embodiment of the invention will now be described with reference to the accompanying drawings, in which:

FIGS. 1 and 2 taken together are a block diagram of the recording end of a prior art system in which "substitute" colors are recorded in trisequential form.

Figure 1:
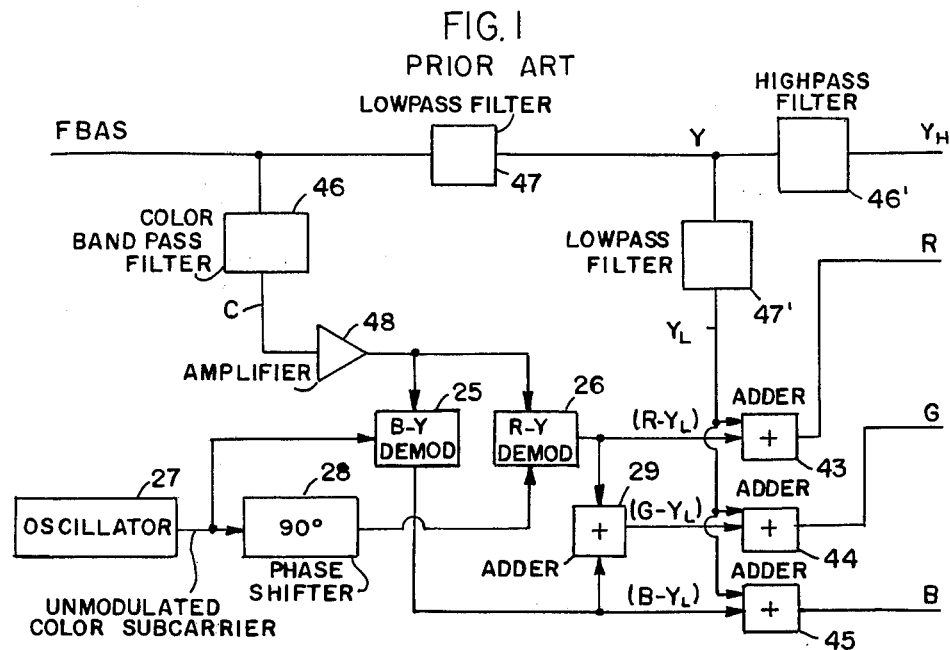
Figure 2:
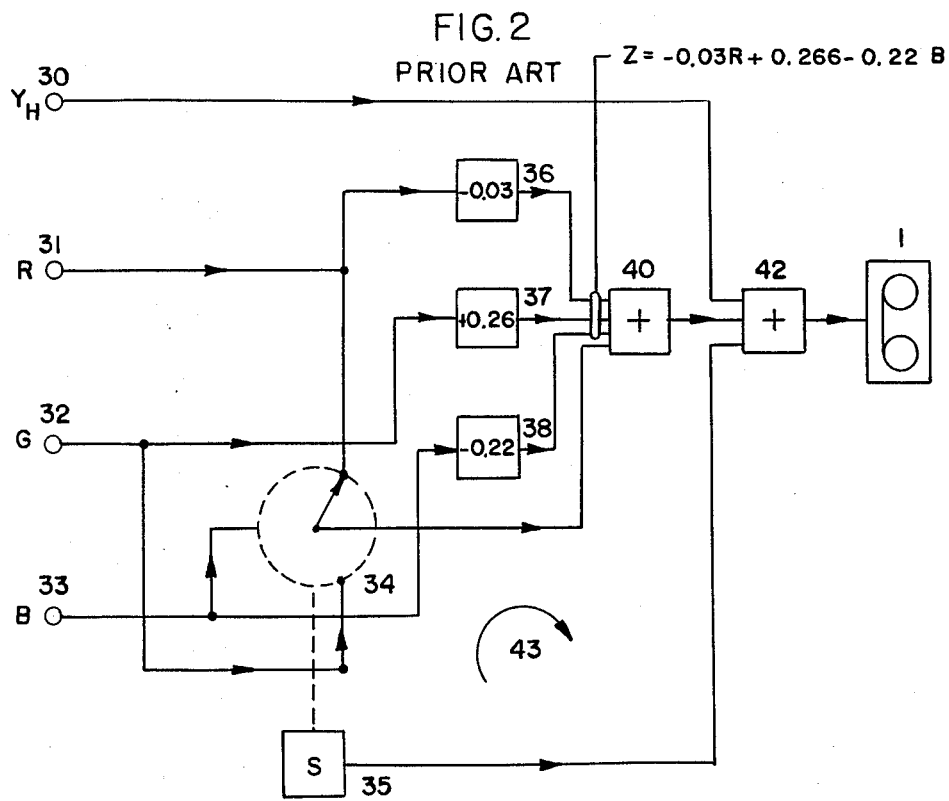

Referring first to FIGS. 1 and 2, the first of these figures illustrates how in prior art systems of the general type underlying the above mentioned patent application DAS No. 2,158,218 the original colors R, G, B are derived from a composite video signal. FIG. 2, which corresponds to FIG. 2 of DAS No. 2,158,218, shows specifically how a trisequential signal containing the substitute colors R', G' and B' is obtained, for recording, from the trisequential original colors R, G, B by means of the addition thereto of a signal Z.

As will be noted from FIG. 1, the composite video signal FBAS, for example an off-air TV signal is split by means of a bandpass filter 46 and a lowpass filter 47 into its chrominance component C and its luminance component Y. It may be mentioned in passing that the system illustrated in prior art FIGS. 1–3, and also that of FIG. 4 showing the demodulating arrangement according to the invention, happens to be one following the PAL (Phase Alternate Lines) pattern. It should be understood, however, that the invention is equally applicable to a system with NTSC (National Television Systems Committee) standards. For the converting of the incoming PAL signals into NTSC signals known delay and switch means are necessary. However, inasmuch as such means are not a part of the invention they have been omitted in the drawings and not been described herein.

As shown in FIG. 1, the chrominance signal C, which is the modulated color subcarrier, after being amplified in amplifier 48 is impressed on an input of each of B-Y demodulator 25 and R-Y demodulator 26. These demodulators are used to detect two different phases of the modulated 4.43 MHz chrominance signal, 4.43 MHz being the subcarrier frequency used in the PAL system. While these two demodulators thus have the same C-signal input they receive different phases of input voltage from oscillator 27 which provides the reinserted, unmodulated color subcarrier of 4.43 MHz. This 4.43 MHz voltage beats with the side frequencies of the modulated chrominance signals to cause the modulators to recover the color signals. It will be seen from FIG. 1 that while demodulator 25 demodulates for the color difference signal B-Y the phase supplied to the other demodulator 26 is shifted 90° by phase shifter 28 so that this last mentioned demodulator demodulates for the color difference signal R—Y which, as shown in FIG. 4, is in quadrature to the B—Y or zero axes of the subcarrier. The difference signals R—$Y_L$ and B—$Y_L$ appearing at the outputs of demodulators 26 and 25, respectively, are combined in adder 29 to form the third color difference signal G—$Y_L$ and these three color difference signals are matrixed with the low-frequency luminance signal $Y_L$ in adders 43, 44 and 45, respectively, to yield at the output of these adders the original colors red (R), green (G) and blue (B). The low-frequency luminance signal $Y_L$, and the high-frequency luminance signal $Y_H$ referred to hereinbelow, are separately derived from luminance signal Y by lowpass filter 47' and highpass filter 46', respectively.

FIG. 2 shows how these basic colors are preprocessed to furnish the desired trisequential signal to be recorded on recorder 1. As shown in FIG. 2, the three colors R, G and B are converted into trisequential form by means of trisequential switch 34 which is driven by synchronously operated trisequential clock pulse generator 35. The original colors R, G and B are also passed through weighting stages 36, 37, 38 and the three partials thus obtained—which taken together yield a signal Z= —0.03R + 0.26G — 0.22B—are added in adder 40 to the trisequential signal R, G, B. The output of this adder is then further processed by matrixing it in adder 42 with the high frequency luminance signal $Y_H$ under the control of generator 35. The output of adder 42 thus yields the trisequential signal (R', G', B')+$Y_H$.

Figure 3:
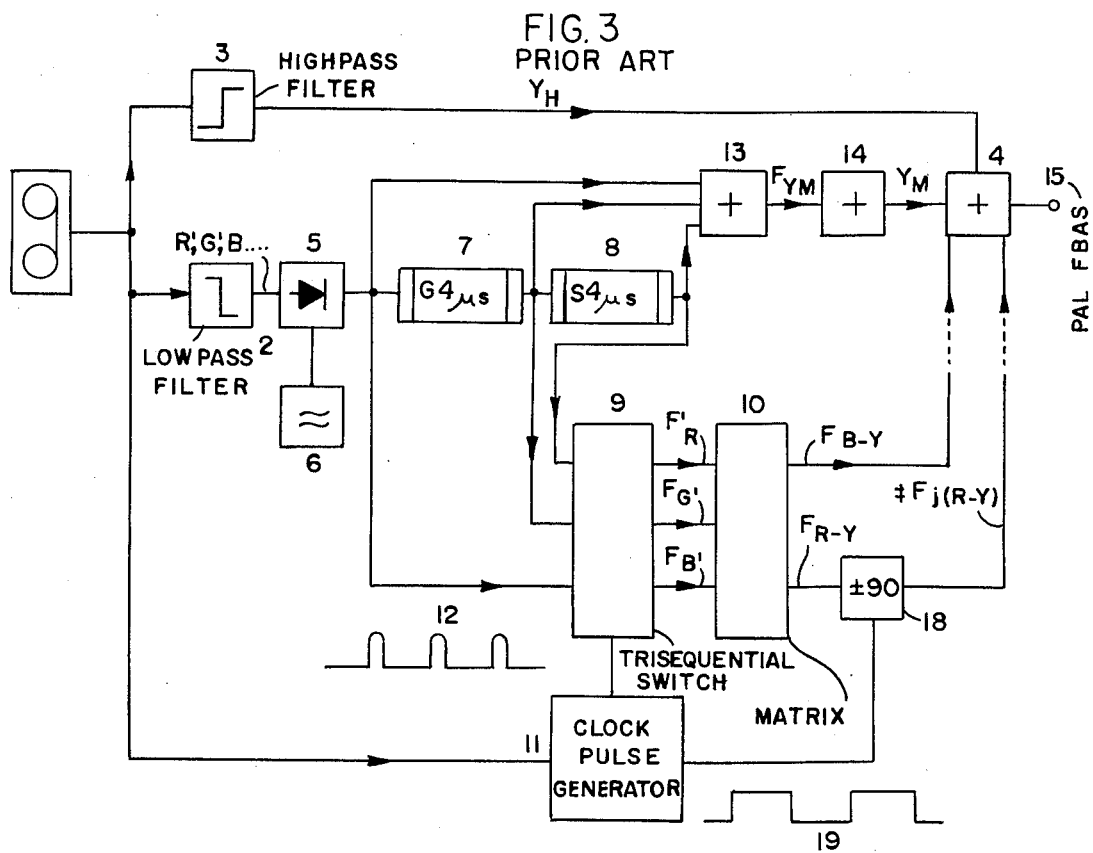
FIG. 3 is a block diagram of the playback end of this prior art system.
Figure 4:
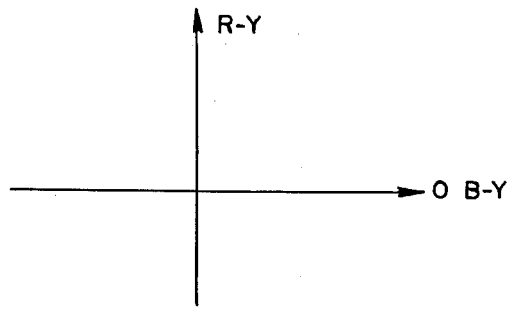
FIG. 4 is a color subcarrier phase chart showing the axes of the color difference signals B—Y and R—Y of FIG. 1.

Turning now to FIG. 3 which shows the playback end of the prior art system according to DAS No. 2,158,218, the off-tape signal reproduced during playback of recorder 1 is passed through lowpass filter 2 to provide the signal R', G', B' (denoted R*, G*, B* in the DAS); and it is passed through highpass filter 3 to provide the high frequency luminance signal $Y_H$ which is impressed on an adder 4. The trisequential signal R', G', B' is modulated in a modulator 5 on an unmodulated subcarrier of 4.43 MHz which is generated in oscillator 6, and the modulation product is impressed on the series arrangement of two 64µs delay lines 7 and 8. Connected to the end terminals of these delay lines as well as to the junction therebetween is a trisequential switch 9 which is controlled by clock pulses 12 of line frequency furnished by generator 11, so that at the output of switch 9 the color subcarrier signals $F_{R'}$, $F_{G'}$ and $F_{B'}$ are continuously provided in parallel form. Matrix 10 transforms signals $F_{R'}$, $F_{G'}$ and $F_{B'}$ into signals $F_{B-Y}$ and $F_{R-Y}$ of color subcarrier frequency. The luminance portion Y of these signals follows the relationship Y= +0.30R + 0.59G + 0.11B as required for black and white compatability. Phase reversal switch 18 is actuated from clock pulse generator 11 by means of a switch voltage 19 of half the line frequency so that the output of this switch alternates between +90 and —90 as required for the reversal, on a line frequency basis, of subcarrier signal $F_{R-Y}$, in accordance with PAL standards.

The video signals of subcarrier frequency appearing at the input, the junction point and the output of the series combination of delay lines 7 and 8 are also impressed on an adder 13 which at its output furnishes the luminance signal $Y_M$=0.33(G'+R'+B') in subcarrier-modulated form while the following demodulating stage 14 derives from this subcarrier signal the luminance signal $Y_M$ itself. This luminance signal $Y_M$=0.33-(G'+R'+B') is then combined in adder stage 4 with luminance signal $Y_H$ and with the aforementioned signals $F_{B-Y}$ and F± $_{j(R-Y)}$ so that as a final result the output of adder 4 yields the PAL FBAS signal at terminal 15.

Summarizing then the operation of the prior art system illustrated in FIGS. 1 to 3, it will be noted that at the playback end $Y_M$=0.33(R'+G'+B') where R'=R+Z, G'=G+Z, B'=B+Z and Z= —0.03R + 0.26G — 0.22B so that $Y_M$= (0.33 — 0.03)R + (0.33 + 0.26)G + (0.33 — 0.22)B = 0.30R + 0.59G + 0.11B, which latter is the relationship called for by black-and-white compatability. At the recording end the above "substituted" color signals R', G', B' are produced fully as suggested by these equations. That is, first the original colors R, G, B are demodulated, typically in the rather laborious fashion illustrated in FIG. 1. Subsequently, as shown in FIG. 2, a trisequential signal is formed from these original colors and then a separate signal Z= −0.03R + 0.26G −0.22B, produced by the "distortion" of the original colors, is added to this trisequential signal to obtain the substitute colors R', G', B' meeting the above equations in trisequential form. The final step consists in the addition of the high-frequency luminance signal in a further adder.

Figure 6:
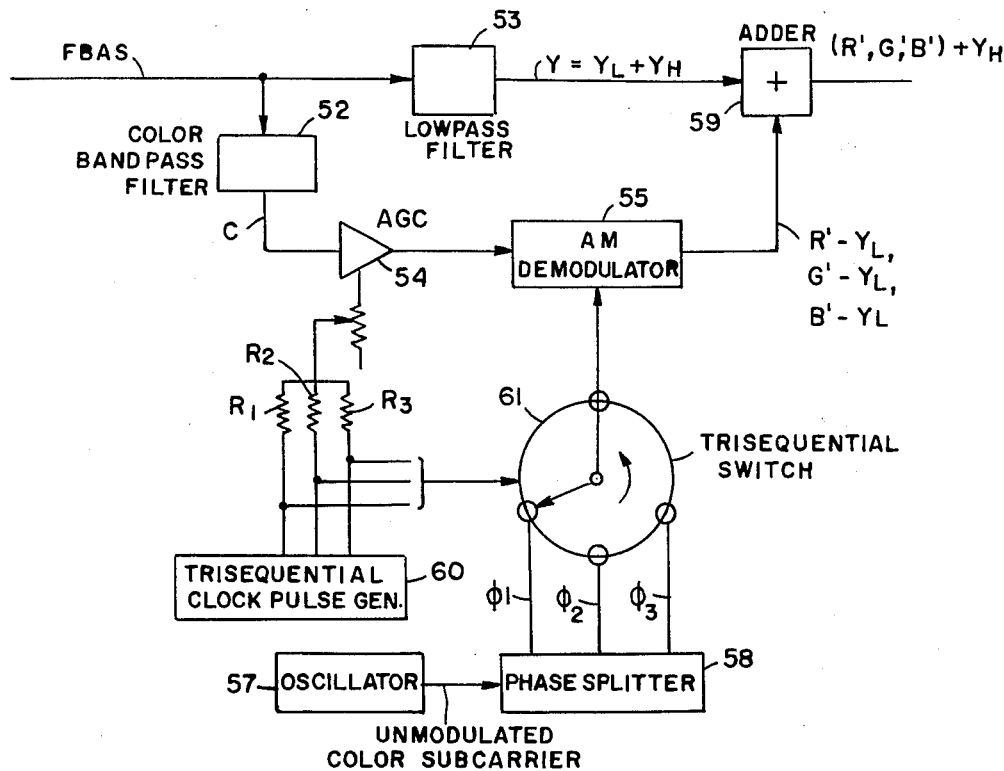
FIG. 6 is a block diagram of the transmitting or recording end of a system using the principles of the present invention.

FIG. 6 shows the demodulating arrangement according to the invention by which trisequential signals containing the substitute color signals R', G', B' are immediately obtained as the result of the synchronous demodulation process so that there is no need to first generate the original colors R, G, B and then further process or distort these color signals by matrixing them with the Z signal to arrive at the substitute colors.

As illustrated in FIG. 6, the composite video signal which may be an off-air TV signal or else a camera signal, is split into its chrominance component C and its luminance component $Y=Y_L + Y_H$ by means of bandpass filter 52 and lowpass filter 53, respectively. The chrominance component is impressed on synchronous AM demodulator 55 by way of an automatic gain control stage 54 described in more detail below. The luminance signal Y is connected to one of the two inputs of adder 59.

Oscillator 57 generates an unmodulated subcarrier of 4.43 MHz (for PAL) and supplies this subcarrier to the input of phase shifter 58. Oscillator 57 is phase locked to the color burst riding on the back porch of the horizontal sync of the composite video signal, for example, in the manner described in copending application Ser. No. 512,364 of Okey et al., filed on Oct. 4, 1974 on a Synchronizing System for Video Recorders. Phase splitter 58 is generally comparable to the phase splitter disclosed in the above referenced copending patent application Ser. No. 473,221 of Okey in that it supplies the trisequential switch, 61, with three different subcarrier phases which are then trisequentially supplied to the bottom input, FIG. 6, of demodulator 55. Trisequential switch 61 is driven by a trisequential clock pulse generator 60.

Figure 5:
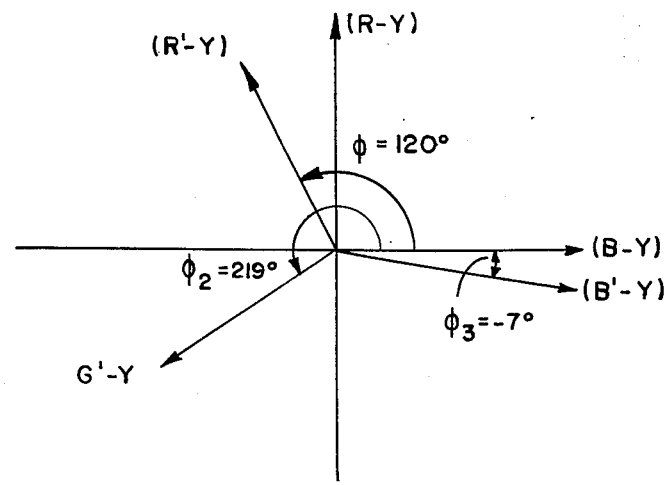
FIG. 5 is a color subcarrier phase chart showing the axes of substitute-color difference signals R'—Y, G'—Y, B'—Y as used in the present invention, in relation to the original-color difference signals R—Y, G—Y, B—Y.

In the case of the present invention the three phases $\phi1$, $\phi2$, $\phi3$ have such angles that demodulation takes place along axes R'—Y, G'—Y, B'—Y, FIG. 5, where R', G' and B' are the above-defined substitute colors. This is significantly different from the arrangement disclosed in copending application Ser. No. 473,221 according to which demodulation occurs along the axes R, G, B, or ultimately the axes R—Y, G—Y, B—Y, where R, G, B are the original colors.

More particularly, in the case of the present invention, and as will be seen from FIG. 5, the angles of phases $\phi1$, $\phi2$ and $\phi3$ are +120°, +219° and −7° (i.e. +353°) as referenced to the B—Y axis, the zero axis of the color burst-derived subcarrier. These phase angles thus are substantially different from the angles of the R—Y, G—Y and B—Y axes and, incidentally, they are also different from the R, G and B axes which, as well known in the art, and as also explained in Okey application Ser. No. 473,221, are 103° for red, 241° for green and 348° for blue (for NTSC, and also for PAL at such times as the color difference signal is not reversed).

Figure 7:
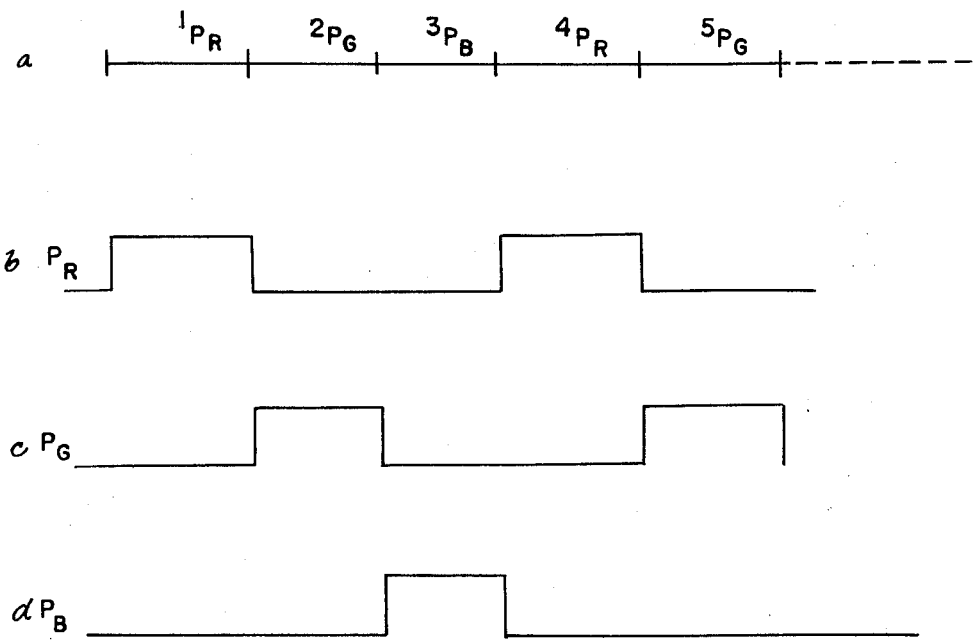
FIG. 7 is a chart illustrating in line a the sequence and in lines b, c and d the step voltage of the pulses $P_R$, $P_G$, $P_B$ produced by the clock pulse generator shown in FIG. 6.

As shown in FIG. 6, the three outputs of trisequential clock pulse generator 60 are not only connected to trisequential switch 61 for driving the latter, but they are also supplied to the input of AGC amplifier 54, viz. by way of resistors R1, R2 and R3, respectively. As will be clear from an inspection of lines a to d of the clock pulse chart, FIG. 7, by virtue of this arrangement different direct current controls are trisequentially impressed on the aforementioned control input. The three pulses $P_R$, $P_G$, $P_B$ per se provide step voltages of equal magnitude. However, during the first interval (first line) in which only clock pulse $P_R$ is high, this voltage is applied through resistor R1, during the second interval (second line) in which only clock pulse $P_G$ is high, this voltage is applied through resistor R2, and during the third interval (third line) in which only clock pulse $P_B$ is high, the voltage is applied through resistor R3, and so on in cyclic repetition.

The result of this automatic and trisequential adjustment of the amplification factor of amplifier 54 is that the magnitude of the chrominance information (R—$Y_L$, B—$Y_L$) is line sequentially established at the values 1.11, 1.21 and 1.5, periodically in a three lines-can cycle. In this manner trisequential signals R'—$Y_L$, G'—$Y_L$, B'—$Y_L$ are obtained at the output of demodulator 55 which are corrected with respect to magnitude. It will be noted that all this is accomplished without any subsequent processing. In adder 59 these trisequential signals are finally matrixed with the luminance signal $Y=Y_L+Y_H$ so that the trisequential signal (R', G', B') + $Y_H$ is produced at the output of this adder. This signal may be used for recording or, alternatively, it may be impressed on the outgoing end of a transmission channel (not shown). The recovery of the original colors at the playback or receiving end has not been illustrated but it could be effected, for example, in the manner shown in FIG. 3.

It should be understood that the foregoing description is not meant to limit the invention to the disclosed embodiment.

It may be added that the angles and amplification factors mentioned in the above description were determined from the following equations:

$$(R'-Y) = k_R (0.493(B-Y) \cos \psi_R + 0.877(R-Y) \sin \psi_R)$$

$$(G'-Y) = k_G (0.493(B-Y) \cos \psi_G + 0.877(R-Y) \sin \psi_G)$$

$$(B'-Y) = k_B (0.493(B-Y) \cos \phi\psi = 0.877(R-Y) \sin \phi\psi)$$

Where $\psi_R$, $\psi_G$ and $\psi_B$ are the angles under which the demodulation occurs in respect to the burst phase and $k_R$, $k_G$, and $k_B$ are the amplification factors.

It is not possible to obtain the same magnitude for the bracket expression on the right side of each of these three equations because the chrominance signal consists of two different attenuated color difference signals (0.493 (B—Y) + 0.877 (R—Y), this attenuation being introduced in the transmitting path of the TV station to avoid over-modulation. In order to come up with the same magnitude, assumed to be 1.0, for all three cases (R'—Y), (G'—Y) and (B'—Y), a different amplification factor $k_R$, $k_G$, $k_B$ has to be used in each of these instances.

More particularly, in case of the demodulation along the (R'—Y) axis under an angle of +120° the magnitude without correction comes out to be 0.90 (R'—Y). Thus, in order to obtain the desired magnitude of 1.0

(R'—Y) the signal must be amplified with the factor 1.11:

$$1.11 \times 0.90 (R'—Y) = 1.0 (R'—Y)$$

In the case of the demodulation along the (G'—Y) axis under an angle of +219° the magnitude without correction would be 0.82 (G'—Y). Therefore, in order to obtain the desired magnitude of 1.0 (G'—Y) the signal has to be amplified with the factor 1.21:

$$1.21 \times 0.82 (G'—Y) = 1.0 (G'—Y)$$

In the case of the demodulation along the (B'—Y) axis under an angle of −7° the magnitude without correction would be 0.66 (B'—Y). Thus, to obtain the desired magnitude of 1.0 (B'—Y) the signal needs to be amplified with the factor 1.5:

$$1.5 \times 0.66 (B'—Y) = 1.0 (B'—Y)$$

In the embodiment described the three amplification factors are established by the resistors R1, R2, R3 in the manner explained above.

I claim:

1. In a color video system of the type in which the chrominance component of a composite video signal is transmitted or recorded as a trisequential sequence containing the substitute color signals R', G', B' and in which at the receiving or playback end there is derived from the trisequential substitute color signals a luminance signal $Y_M = 0.33(R'+G'+B')$ where R', G', B' are chosen so as to substantially satisfy the relationship, $Y_M = +0.30R + 0.11B$, required for black and white compatibility, the improvement that for producing said sequence of substitute color signals there are provided:

three-phase demodulating means having a chrominance component and also an input from a trisequential switch means, said trisequential switch means being connected to phase-splitting means driven by a synchronized oscillator of color subcarrier frequency and supplying said trisequential switch means with three color subcarrier phases $\phi 1$, $\phi 2$ and $\phi 3$ of such angles as to cause said demodulating means to trisequentially demodulate said chrominance component directly along axes related to said substitute colors R', G', B', and gain control means interposed in series relationship with said demodulating means for automatically and trisequentially varying the chrominance component gain so as to bring about corresponding corrections of the magnitudes of the individual demodulated signals, whereby the need for means first producing the original colors R, G, B, and then processing the last mentioned colors to derive therefrom the substitute colors R', G', B' is obviated.

2. The improvement in a color video system as claimed in claim 1, wherein said demodulating means are designed to trisequentially demodulate said chrominance component along the color difference axes R'—Y, G'—Y, B'—Y.

3. The improvement in a color video system as claimed in claim 1, wherein said axes have the angles +120°, +219° and −7°, respectively, and wherein said gain control means is designed to provide the amplification factor 1.11 for the individual chrominance information of each first line, the factor 1.21 for the individual chrominance information of each second line and the factor 1.5 for the individual chrominance information of each third line.

4. The improvement in a color video system as claimed in claim 1 wherein there are provided means for adding to the signals supplied by said demodulating means the luminance component of the composite video signal.

5. In a color video system of the type in which the chrominance component of a composite video signal is transmitted or recorded as a trisequential sequence containing the substitute color signals R', G', B' and in which at the receiving or playback end there is derived from the trisequential substitute color signals a luminance signal $Y_M = 0.33(R'+G'+B')$ where R', G', B' are chosen so as to substantially satisfy the relationship, $Y_M = +0.30R + 0.59G + 0.11B$, required for black and white compatibility, the improvement that for producing said sequence of color signals there are provided:

three phase demodulating means having a chrominance component input and also an input from a trisequential switch means said trisequential switch means being connected to phase-splitting means driven by a synchronized oscillator of color subcarrier frequency and supplying said trisequential switch with three color subcarrier phases $\phi 1$, $\phi 2$ and $\phi 3$ of such angles as to cause said demodulating means to trisequentially demodulate said chrominance component directly along the color difference axes R'—Y, G'—Y, B'—Y, gain control means interposed in series relationship with said demodulating means for automatically and trisequentially varying the chrominance component gain to bring about corresponding corrections of the magnitudes of the three individual color difference signals $R'—Y_L$, $G'—Y_L$, and $B'\lambda—Y_L$, respectively, and a trisequential clock pulse generator connected to said trisequential means for synchronously driving said switch means and connected to said gain control means for synchronously correcting said magnitudes, whereby the need for means first producing the original colors R,G,B, and then processing the last mentioned colors to derive therefrom the substitute colors R',-G',B', is obviated.

6. In a color video system of the type in which the chrominance component of a composite video signal is transmitted or recorded as a trisequential sequence containing the substitute color signals R', G', B' and in which at the receiving or playback end there is derived from the trisequential substitute color signals a luminance signal $Y_M = 0.33(R'+G'+B')$ where R', G', B' are chosen so as to substantially satisfy the relationship, $Y_M = +0.30R + 0.59G + 0.11B$, required for black and white compatibility, the method of producing said sequence of substitute color signals, comprising the steps of:

deriving from a synchronized unmodulated subcarrier three subcarrier phases along the axes R'—Y, G'—Y, B'—Y, respectively;

synchronously demodulating the chrominance component of said composite video signal trisequentially along the associated axes with the aid of said subcarrier phases to generate the signals $R'—Y_L$, $G'—Y_L$, $B'—Y_L$;

and adding thereto the luminance component $Y = Y_L + Y_H$ of the composite video signal where $Y_L$ is the low-frequency portion and $Y_H$ the high-frequency portion of the luminance component, thereby to produce the trisequential signal $(R', G', B') + Y_H$ for transmission or recording.

* * * * *

UNITED STATES PATENT AND TRADEMARK OFFICE
CERTIFICATE OF CORRECTION

PATENT NO. : 3,946,431
DATED : March 23, 1976
INVENTOR(S) : GANTERT

It is certified that error appears in the above-identified patent and that said Letters Patent are hereby corrected as shown below:

In Column 7, Claim 1 Line 34, delete "$Y_m=+0.30R+0.11B$," and substitute -- $Y_m=+0.30R+0.59G+0.11B$, --

Signed and Sealed this

Tenth Day of August 1976

[SEAL]

Attest:

RUTH C. MASON
*Attesting Officer*

C. MARSHALL DANN
*Commissioner of Patents and Trademarks*